Dec. 18, 1928.  1,696,052
A. OVTSCHINNIKOFF
MACHINE FOR MANUFACTURING AND PACKING MATCHES
Filed Feb. 18, 1927   2 Sheets-Sheet 1
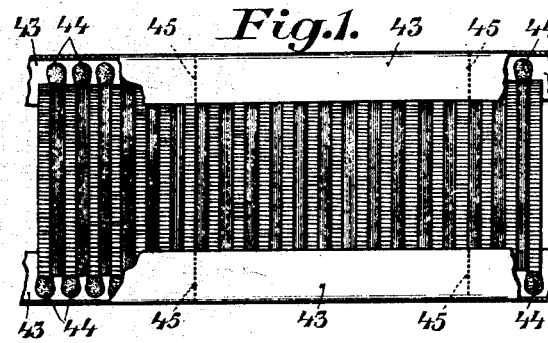
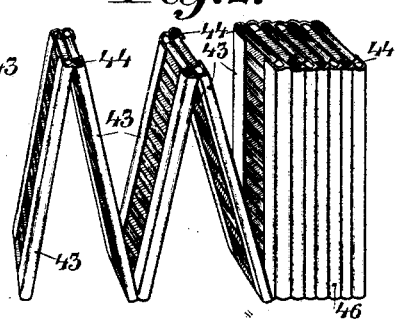
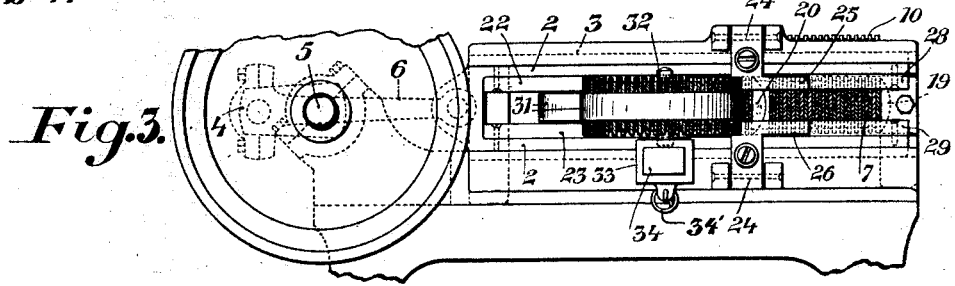
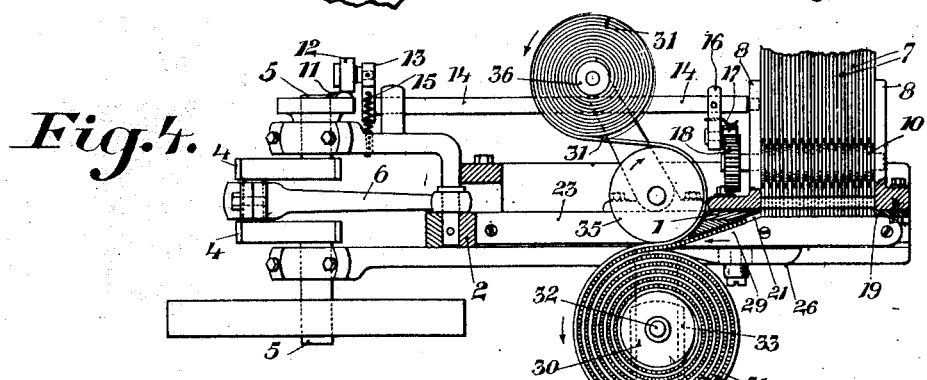
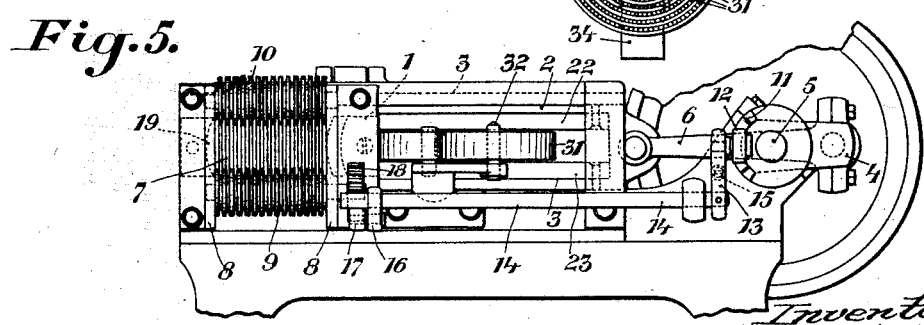
Inventor
Alexander Ovtschinnikoff Dec. 18, 1928.

A. OVTSCHINNIKOFF 1,696,052

MACHINE FOR MANUFACTURING AND PACKING MATCHES

Filed Feb. 18, 1927    2 Sheets-Sheet 2

Inventor
Alexander Ovtschinnikoff
By
Attorney

Patented Dec. 18, 1928.

1,696,052

UNITED STATES PATENT OFFICE.

ALEXANDER OVTSCHINNIKOFF, OF ARNSTADT, GERMANY.

MACHINE FOR MANUFACTURING AND PACKING MATCHES.

Application filed February 18, 1927, Serial No. 169,311, and in Germany February 18, 1926.

This invention relates to improvements in matchmaking machines, one object of the invention being the provision of a machine for cutting strips of match sticks from a pack of sheets of wood and for displacing alternately said sheets so that the heads of the matches to be formed are displaced alternately to facilitate the dipping of the same to prevent the adherence of one head to the other.

Another object of this invention is the provision of a receiving and holding device for receiving the severed and displaced sticks in strips, so that the same may be easily handled for dipping to coat the heads, and also the novel arrangement of a dipping machine whereby a convoluted web of severed strips is formed in a bundle so that the opposite ends may one at a time be dipped for receiving the illuminant.

Heretofore, machines have been provided for either notching a sheet of alternately displaced head ends of the matches, or to cut one stick at a time and alternately displace the ends of the cut sticks, while with the present machine, the sheets of wood are placed in a pack, and the receiving and delivering means just prior to the cutting operation alternately displaces the edges of the sheets, so that a strip of sticks with their ends alternately displaced are cut at one time, and presented to a resilient holding means, whereby one strip of sticks at a time are received and formed into a convoluted elastically held package.

In the accompanying drawings:—

Figure 1 represents, in plan view, a portion of a completed strip of matches made according to this invention.

Figure 2 shows a method of stacking the same.

Figure 3 is a side view of the cutting and bundling machine taken from the outlet side thereof.

Figure 4 is a top plan view of said machine.

Figure 5 is a view similar to Figure 3 taken from the inlet side of the machine.

Figure 6:
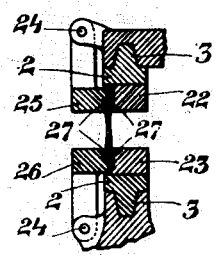
Figure 6 is a section taken on line 6—6 of Figure 8.

Referring to the drawings, a knife 1 is mounted in a frame 2, and said knife is horizontally reciprocated between the guides 3 through the medium of the crank 4 of the drive shaft 5, there being a connecting rod 6 interposed therebetween. The knife is mounted to cut a web or strip of sticks from the pack 7 composed of a series of sheets of wood that are presented at one side of the box 8, each of said sheets being of the thickness of the match to be produced. These sheets have been produced in a well known manner in a peeling or veneer machine, compressed in a moist state, and paraffined. In this way, the end or edge of each sheet is saturated or coated with paraffine in the usual preparatory manner. As before stated, the sheets are made in a pack or pile with the paraffined longitudinal edges of one sheet disposed upon the opposite side to the paraffined edge of the opposite sheet; in other words, they are alternately displaced, the projecting ends being paraffined ends.

For the production of the matches, these sheets must remain in this position or be operated upon to assume this position, and this is done by means of the grooved cylinders 9 and 10, the grooved cylinder 9 serving as the operating cylinder and the cylinder 10 which is mounted to rotate freely as the abutting cylinder. Each of these cylinders, as before stated, are grooved and the grooves thereof are disposed in staggered relation relatively to each other, so that each rib of the working cylinder 9 stands opposite a groove in the abutting cylinder 10. Thus as the pack of sheets moves between the rollers, the thickness of each sheet being substantially the width of each groove or rib of the respective cylinders, the said sheets are shifted so that the impregnated edges of the sheets are displaced alternately and project beyond at both sides of the pack. The operating cylinder 9 is intermittently rotated by the driving shaft 5, prior to every cutting movement of the knife 1, and sufficiently to advance the pack of sheets a distance equivalent to the thickness of one match. This is effected by a cam 11 which is keyed upon the driving shaft 5 and actuates the roller 12 mounted on the lever 13, said roller bearing upon said cam and said lever being fixed upon the rock shaft 14. The roller 12 is held by means of the spring 15 against the cam 11. The shaft 14 carries on its other end a lever 16 on which a spring-controlled pawl 17 is mounted, said pawl engaging the ratchet wheel 18 keyed on the shaft of the lower cylinder 9. Thus, at every rotation of the driving shaft 5, the cylinder 9 is partially rotated and sufficiently to advance the pack of sheets a distance equal to the thickness of the match, so that from each pack one strip of sticks may be cut at the same time.

In order that the knife 1 may make a smooth clean cut up to and through the last sheet 7, a rubber buffer 19 is mounted at the end of the box 8 into which the cutting edge of the knife 1 may enter, and said knife is preferably provided with a curved cutting edge 20 (Figure 3) so as to insure a clean cut through the sheets.

It will thus be seen that the strip of sticks cut from the pack of sheets will enter the channel 21 (Figures 7 and 8), this channel being formed by the two plates 22 and 23 attached to the straight guides 3 of the machine. The plates 22 and 23 are supported by plates 25 and 26 which, in turn, are hingedly fixed to the machine frame. The opposed faces of the plates 22, 23, 25 and 26 are grooved as at 27 (Figure 6), the grooves 27 of the plates 22 and 23 being wider than the opposing grooves 27 of the plates 25 and 26 in order that the ends of the cut sticks which enter said grooves may be alternately guided, the one with the head upward and the other with the head downward, and remain in this staggered position, the one with regard to the other and slightly turned by the grooves 27 so that they assume a criss-cross position, as shown in Figure 6.

Thus it will be seen that the webs of cut sticks are caused to preserve their relative position after they have entered the channel 21 and into the grooves 27 of the plates above referred to, and are, therefore, in the proper position to be received and bundled, as will presently appear.

Figure 7:
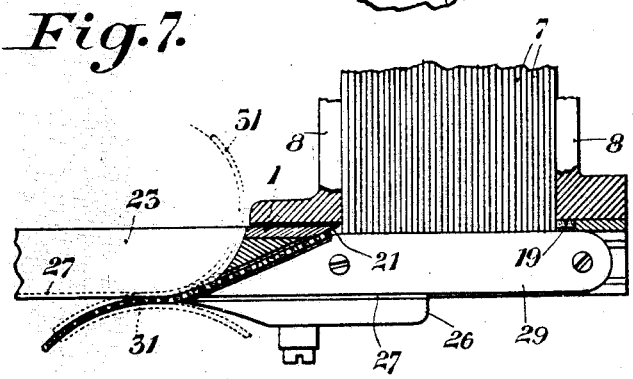
Figure 7 shows, on a larger scale, a top plan view of the cutting mechanism at the initial movement of the cutting operation.
Figure 8:
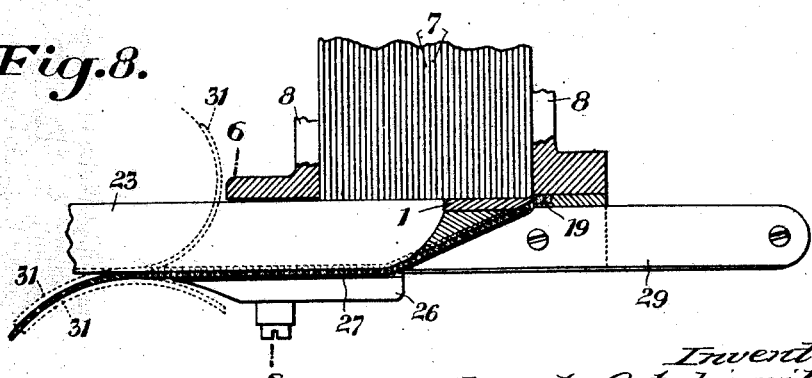
Figure 8 is a similar view at the final movement of the cutting operation.

By means of the wedge-shaped guides 28 and 29 (Figures 3, 7 and 8), the sticks lying close together are advanced at the return stroke of the knife (Figure 8) into the channel 21, or, as shown in Figure 7, the paraffined ends of the cut sticks projecting alternately at the top and at the bottom, and in which position they are delivered to the winding up or receiving drum 30. In order that the intermittently fed webs or strips of stick may be properly positioned upon the drum 30, there is an elastic band 31 which is fed from the supply reel around the guide pulley 35, the vertical axle 32 of the drum 30 resting upon the shoe 34, which is moved longitudinally of the support 33 by the action of the spring 34' and forward of the guide pulley 35 above referred to. During this action the elastic band 31 is unwound from its bobbin in accordance with the intermittent speed at which the cut sticks or web are fed through their guides between the convolutions of the elastic band, the guide pulley 35 assisting the band and tensioning the same so that the webs of sticks are probably held in a convoluted bundle, as is the usual practice. The elastic band 31, as shown in Figure 3, is of a width narrower than the length of anyone of the sticks so that the alternately displaced ends upon opposite sides of the bundle project beyond the respective edges of the elastic band.

Figure 9:
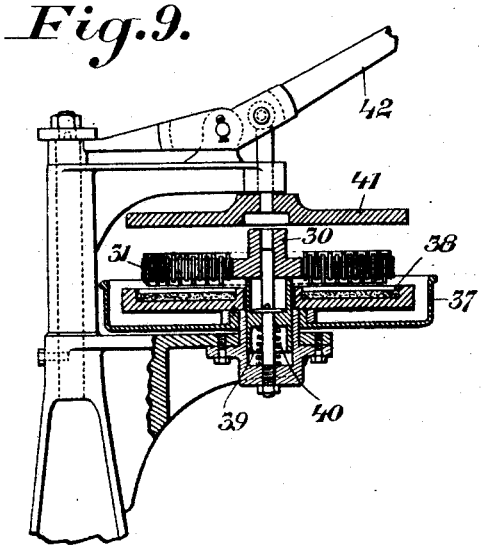
Figure 9 is a view, partly in section and partly in elevation, of the dipping machine.

When the bundle has assumed the proper size, the machine is stopped and the convoluted bundle and drum 30 are removed from its axle 32, properly bound to prevent the normal unwinding thereof, and is then placed in the dipping machine (Figure 9).

The dipping machine consists of a vessel 37 to contain the inflammable compound and in which is mounted a match contacting the elastic disk or bottom 38, the same being vertically movable so that when the package of sticks to be dipped are positioned, as shown in Figure 9, with the drum 30 resting upon the central pin of the dipping machine and above the spring propelled cylinder 39 which is normally held up by the spring 40, a hand lever 42 is depressed, causing the disk 41 to engage the drum 30 and consequently force the bundle downwardly so that the alternately displaced ends upon the lower portion of the bundle are caused to engage the elastic bottom 38, and as the inflammable compound covers the same, the heads are covered, as is the usual practice. The disk 41 is then released by moving the lever 42 upwardly, the drum 30 being removed and reversed so that the upper ends of the sticks are now downwardly and in a position to be immersed.

After the package is removed from the dipping machine and permitted to dry the matches are ready for packing and the same is preferably packed, as shown in Figures 1 and 2, by a packing machine covered by a separate application, but which attaches the protecting strip 43 of tearable material so as to cover without contacting the heads 44 of the matches, the same being adhesively attached to the body of the sticks beyond the heads and being serrated, as at 45, so that the strip may be folded accordion-like, as illustrated in Figure 2, and thus present a series of protected strips for ready and easy handling, the same, when in the accordion shape, being stacked to form a package 46.

I claim:—

1. In a machine for manufacturing match sticks, a reciprocating cutter, and a device for receiving a pack of sheets of wood and alternately displacing the edges of said sheets prior to the presentation thereof to the cutter, and means for operating the cutter to sever a strip of sticks at a time from said sheets, one stick from each sheet, said displacing means including two rotary grooved cylinders and between which the pack of sheets is received, the grooves of the two cylinders being alternately opposed to receive and thus alternately displace the edges of the sheets of wood.

2. In a machine for manufacturing match sticks, a reciprocating cutter, a device for receiving a pack of sheets of wood and alternately displacing the edges of said sheets prior to the presentation thereof to the cutter, means for operating the cutter to sever a strip of sticks at a time from said sheets, one stick from each sheet, said displacing means including two rotary grooved cylinders and between which the pack of sheets is received, the grooves of the two cylinders being alternately opposed to receive and thus alternately displace the edges of the sheets of wood, one of said cylinders being intermittently rotated, and a drive shaft for operating the cutter and cylinder in timed relation.

3. In a machine for manufacturing match sticks, a reciprocating cutter, a device for receiving a pack of sheets of wood and alternately displacing the edges of said sheets prior to the presentation thereof to the cutter, means for operating the cutter to sever a strip of sticks at a time from said sheets, one stick from each sheet, said displacing means including two rotary grooved cylinders and between which the pack of sheets is received, the grooves of the two cylinders being alternately opposed to receive and thus alternately displace the edges of the sheets of wood, wedge-shaped guides to receive a strip of sticks after it has been severed, a rotatable drum, an elastic band, and means for guiding said band so that the band is wound upon the drum with the successive strips of sticks between the convolutions thereof, the elastic band being of lesser width than the length of said sticks.

4. In a machine for manufacturing match sticks, a reciprocating cutter, a device for receiving a pack of sheets of wood and alternately displacing the edges of said sheets prior to the presentation thereof to the cutter, means for operating the cutter to sever a strip of sticks at a time from said sheets, one stick from each sheet, said displacing means including two rotary grooved cylinders and between which the pack of sheets is received, the grooves of the two cylinders being alternately opposed to receive and thus alternately displace the edges of the sheets of wood, two plates and two counter plates relatively adjustable to each other, each plate having a cut-out portion through which said cut sticks must pass and whereby every pair of sticks assumes a criss-cross position to insure their alternately displaced position, means for moving the cut strip of sticks between said plates, and means for receiving successively and forming said strips into a separated yet a continuous convolution.

5. In a machine of this character, a dipping apparatus to coat the heads of matches while in a convoluted pack; and consisting of a trough to contain an inflammable compound, a vertically movable elastic surface mounted in said trough, a vertically movable spring-controlled cylinder abutting the underside of the plate and normally holding the plate upwardly and means for cooperating with the plate to compress a pack of match sticks therebetween, the lower heads of the pack engaging the elastic plate during the immersing of the heads.

In testimony whereof I have hereunto set my hand.

ALEXANDER OVTSCHINNIKOFF.